(12) United States Patent
Wu

(10) Patent No.: US 7,263,826 B2
(45) Date of Patent: Sep. 4, 2007

(54) MUFFLER DEVICE WITH CATALYSTS FOR IMPROVING PURIFYING EXHAUST GAS OF NITROGEN OXIDES WITHIN A MOTORCYCLE EXHAUST PIPE

(75) Inventor: Hsiao Chung Wu, Taoyuan (TW)

(73) Assignee: Sentec E&E Co., Ltd., Lungton, Taoyuan (TW)

( * ) Notice: Subject to any disclaimer, the term of this patent is extended or adjusted under 35 U.S.C. 154(b) by 0 days.

(21) Appl. No.: 11/299,131

(22) Filed: Dec. 12, 2005

(65) Prior Publication Data

US 2006/0101813 A1 May 18, 2006

(51) Int. Cl.
*F01N 3/10* (2006.01)

(52) U.S. Cl. .............................. 60/299; 60/289; 60/293; 60/314; 60/324; 181/227; 181/245; 181/269; 181/272

(58) Field of Classification Search .................. 60/289, 60/293, 299, 304, 312, 313, 317, 323, 324; 181/227, 228, 240, 245, 269; 180/272, 258, 180/264
See application file for complete search history.

(56) References Cited

U.S. PATENT DOCUMENTS 4,894,987 A * 1/1990 Harwood et al. ............. 60/299
5,043,147 A * 8/1991 Knight ......................... 422/180
5,218,817 A * 6/1993 Urata ............................ 60/274
5,392,602 A * 2/1995 Matsumoto ................... 60/299
5,457,290 A * 10/1995 Sase et al. .................... 181/258
5,519,994 A * 5/1996 Hill ............................. 60/313
6,588,203 B2 * 7/2003 Hirota et al. .................. 60/297

* cited by examiner

*Primary Examiner*—Binh Q. Tran

(57) ABSTRACT

A muffler device with catalysts for improving purifying exhaust gas of nitrogen oxides within a motorcycle exhaust pipe comprises a muffler divided into three chambers, a first chamber, a second chamber, and a third chamber; a front exhaust pipe; a front reduction catalyst; a rear exhaust pipe provided with a secondary air inlet behind the reduction catalyst for introducing secondary air therein. Thereby, the exhaust gas from an engine with air-to-fuel ratio less than or equal to 14.7 will firstly pass the reduction catalyst to have its nitrogen oxides (NOX) effectively inverted into nitrogen (N2) and oxygen (O2), and then secondary air will be added to the exhaust gas so as to increase its air-to-fuel ratio to larger than 14.7, and finally the exhaust gas will pass the oxidation catalyst to have its carbon monoxide (CO) and hydrocarbons (HC) effectively inverted into carbon dioxide (CO2) and water (H2O).

7 Claims, 3 Drawing Sheets

US 7,263,826 B2

MUFFLER DEVICE WITH CATALYSTS FOR IMPROVING PURIFYING EXHAUST GAS OF NITROGEN OXIDES WITHIN A MOTORCYCLE EXHAUST PIPE

FIELD OF THE INVENTION

The present invention relates to purify of waste gas from motorcycle, and particularly to a muffler device with catalysts for improving purifying exhaust gas of nitrogen oxides within a motorcycle exhaust pipe which arranges the muffler, a reduction catalyst, an oxidation catalyst and a secondary air inlet, as well as a means for controlling the air-to-fuel ratio of exhaust gas utilizing the arrangement.

BACKGROUND OF THE INVENTION

The air-to-fuel ratio (A/F) referred in the present invention refers to the volumetric ratio of the air to fuel in the exhaust gas from an engine. To attain an ideal operating condition for an engine, the air-to-fuel ratio of the air-fuel mixture is controlled around 14.7, as shown by the shadowed region in FIG. 1. This region not only avoids incomplete combustion of the fuel but also enhances cleaning pernicious gases in the exhaust gas by reduction and oxidation reactions.

The motorcycles in the market do not have an air-to-fuel ratio control means, except for those equipped with an engine control unit (ECU) and oxygen sensor. Considering production cost, motorcycles with small values of air displacement do not have an oxygen sensor. Without an oxygen sensor, precise control of the air-to-fuel ratio near 14.7 is difficult so that the combustion efficiency of the engine is low and the problem of incomplete combustion becomes more significant.

Further, the factors influence the effectiveness of inverting exhaust gas from a motorcycle engine include the technology of installing catalysts and the arrangement of a secondary air inlet. A common method of the prior art is installing one or more than one metallic catalyst carriers doped with precious metals selected from rhodium (Rh), platinum (Pt) and palladium (Pd) in the exhaust pipe of a motorcycle. A secondary air inlet is further installed in front of the catalyst carriers for sucking the air from outside into the exhaust pipe so that the air-to-fuel ratio of the exhaust gas becomes larger than 14.7, enhancing the efficiency of inverting carbon monoxide (CO) and hydrocarbons (HC) effectively into carbon dioxide (CO2) and water (H2O). However, the high oxygen content of the exhaust gas and the high temperature due to oxidation seriously lower the efficiency of inverting nitrogen oxides (NOX). And the nitrogen oxides (NOX) therefore released in the atmosphere contribute to the formation of acid rains and the destruction of the ozone layer.

There are some prior arts related to the present invention. One of the prior art is U.S. Pat. No. 3,943,709, in the prior art, process and apparatus for reducing emissions from internal combustion engine exhaust gas. The exhaust gas treatment system includes a first stage converter containing a NO.sub.x reduction catalyst, a second stage converter containing a catalyst for oxidation of CO and hydrocarbons, and means for admitting secondary air to the inlet of the second stage. Reduced CO and hydrocarbon emissions are obtained by admitting air in an amount not greater than that required to achieve a stoichiometric mixture to the inlet of the first stage during cold (i.e., choked) engine operation, discontinuing the flow of air to the first stage inlet when the average air-fuel ratio reaches approximately its normal warm engine value, and thereafter continuing operation without adding an appreciable quantity of air to the inlet of the first stage. The engine is operated with a substantially net rich average air-fuel ratio during warmup and with a slightly net rich average air-fuel ratio thereafter.

In another prior art, U.S. Pat. No. 5,706,653, a secondary air supply apparatus for an internal combustion engine is provided with an air-fuel ratio sensor disposed upstream of an catalytic converter in an exhaust passage. An outlet port of a secondary air supply conduit is formed upstream of and in the vicinity of the air-fuel ratio sensor. Air discharged from an air pump is supplied to the exhaust passage through the secondary air supply conduit. A control unit diagnoses as to whether or not the air-fuel ratio sensor is activated by checking as to whether a detection signal of the air-fuel ratio sensor is out of a predetermined range or not. Then, the control unit diagnoses as to whether the supply of the secondary air is normal or not on the basis of the detection signal of the air-fuel ratio sensor. Therefore, the diagnosis of the supply of the secondary air is correctly executed.

In another prior art U.S. Pat. No. 3,896,616 discloses an exhaust gases from internal combination engine which are purified by catalyst treatment. The systems have an initial catalyst, preferable in a separate vessel near the engine, and a substantially-in-line catalyst. Preferably, the catalysts are of the honey-type. The exhaust gases and an excess of oxygen, with or without a supplemental fuel, are passed through the initial catalyst during the start up of the engine to insure that the exhaust gases are purified more or less as soon as the engine begins operation. In order to reduce the amount of nitrogen oxides in the exhaust after start-up an excess of extraneous fuel is fed to the initial catalyst to reduce nitrogen oxides to nitrogen. The subsequently in line catalyst serves to reduce the carbon monoxide and hydrocarbon contents of the exhaust gases.

Above three citations provide an exhausting gas purifying system, which conclude reduction catalyst and oxidation catalyst so as to purifying the wasted gas from an engine. However as we know above mentioned structure can not effective purifying the exhausting gas. There is an eager demand for a novel design which can effectively purifying waste gas.

The division of the muffler into the first, second and third chambers has the effect of disturbing the molecules in the gas so as to clean the exhausting gas from the outlet of the rear exhaust pipe. Thus the exhaust gas is processed effectively.

SUMMARY OF THE INVENTION

Accordingly, the primary objective of the present invention is to provide a muffler device with catalysts for improving purifying exhaust gas of nitrogen oxides within a motorcycle exhaust pipe, whereby nitrogen oxides (NOX) will be more effectively removed without sacrificing the effectiveness of inverting carbon monoxide (CO) and hydrocarbons (HC).

To achieve the above objective, the present invention as a muffler device with catalysts for improving purifying exhaust gas of nitrogen oxides within a motorcycle exhaust pipe. The muffler device comprises a muffler divided into three chambers, a first chamber, a second chamber, and a third chamber; the first and second chamber being spaced by a first partition board; the second and third chambers being isolated by a second partition board; wherein there are vents being formed on the first and second partition board; a front exhaust pipe connected to an exhaust terminal of an engine for receiving exhausting gas from the engine; a front reduction catalyst disposed within a front exhaust pipe near the exhaust terminal of an engine; a rear exhaust pipe provided with a secondary air inlet behind the reduction catalyst for introducing secondary air therein; when there are reduction catalysts disposed in the front exhaust pipe, the secondary air inlet is located behind the rearmost of the reduction catalysts. Thereby, the exhaust gas from an engine with air-to-fuel ratio less than or equal to 14.7 will firstly pass the reduction catalyst to have its nitrogen oxides (NOX) effectively inverted into nitrogen (N2) and oxygen (O2), and then secondary air will be added to the exhaust gas so as to increase its air-to-fuel ratio to larger than 14.7, and finally the exhaust gas will pass the oxidation catalyst to have its carbon monoxide (CO) and hydrocarbons (HC) effectively inverted into carbon dioxide (CO2) and water (H2O).

DETAILED DESCRIPTION OF THE INVENTION

Figure 1:
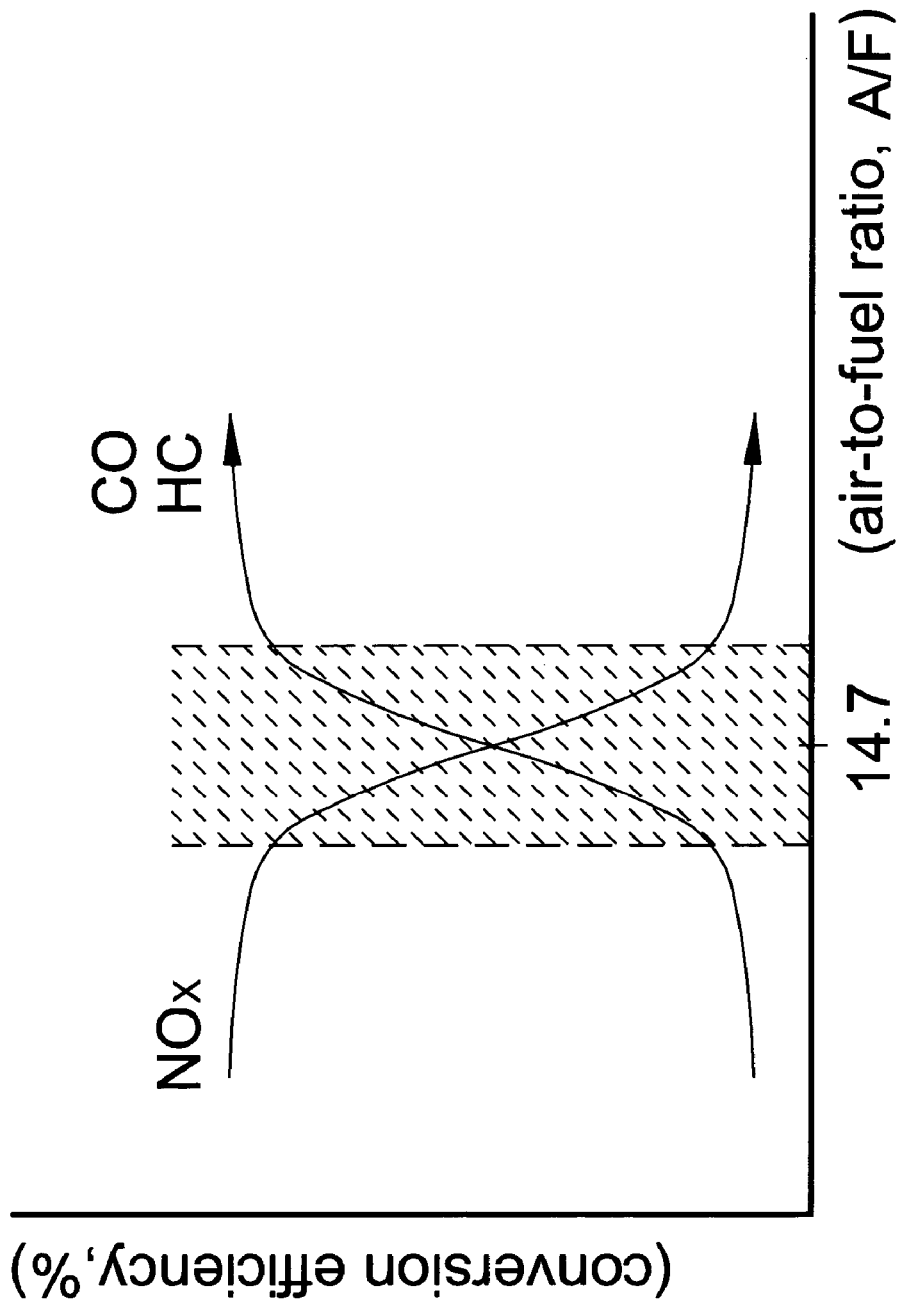
FIG. 1 is a plot disclosing the idealized conversion efficiency versus air-to-fuel ratio relation, wherein a compromised optimum transition percentage occurs at an air-to-fuel ratio of 14.7.
Figure 2:
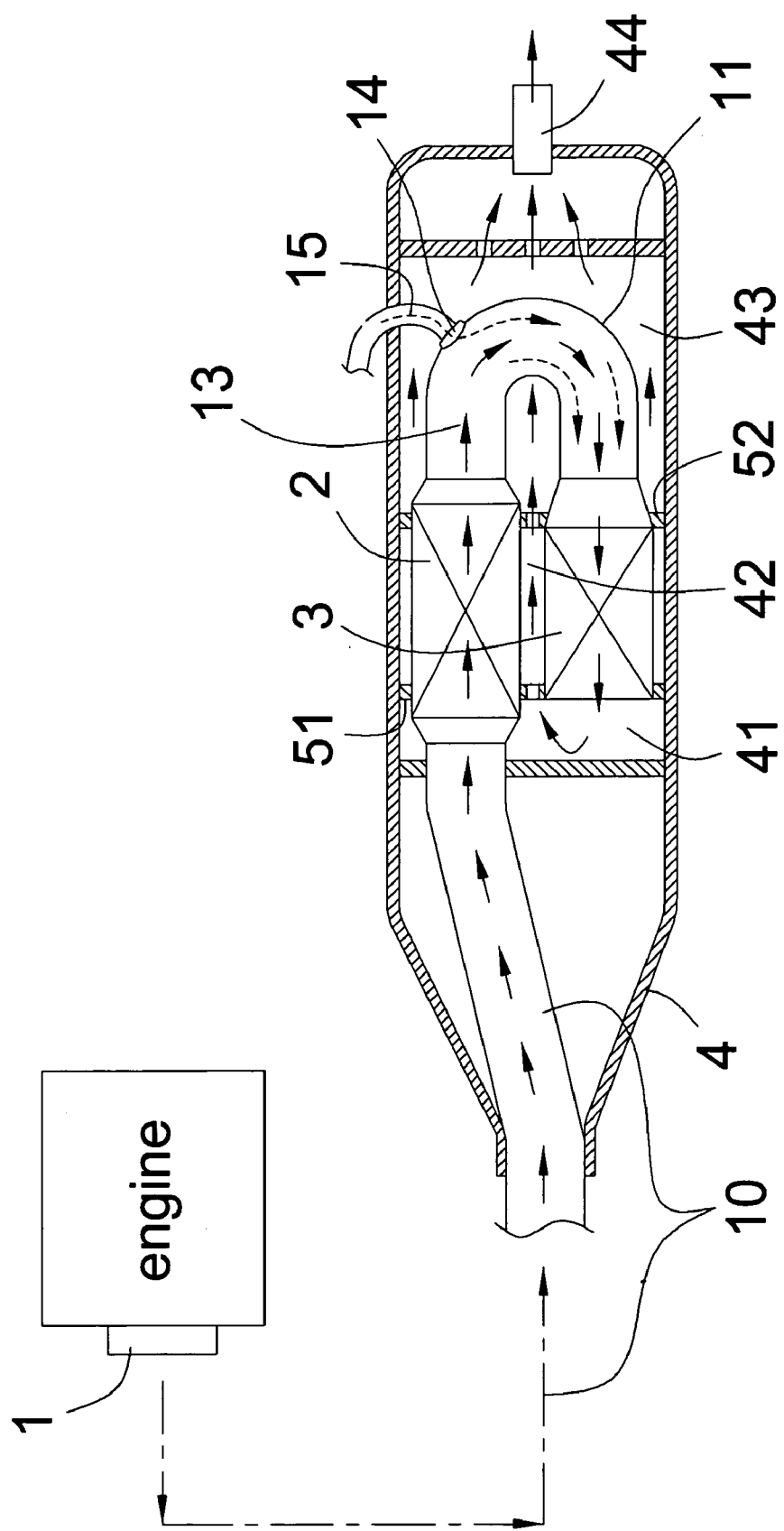
FIG. 2 is a diagram showing the layout of the present invention in an exhaust pipe, wherein the operational process from a front exhaust gas, a reduction catalyst, a secondary air inlet, a rear exhaust gas and an oxidation catalyst is illustrated.

Referring to FIG. 2, a preferred embodiment of the present invention for improving purifying exhaust gas of nitrogen oxides within a motorcycle exhaust pipe has the following elements.

A muffler 4 is divided into three chambers, a first chamber 41, a second chamber 42 and a third chamber 43. The first and second chamber 41, 42 are spaced by a first partition board 51. The second and third chambers 42, 43 are isolated by a second partition board 52. There are vents being formed on the first and second partition board 51 and 52 so that air can flowing through those vents. The muffler 4 further includes a muffler outlet 44.

A front exhaust pipe 10 is connected to an exhaust terminal 1 of an engine for receiving exhausting gas from the engine 1.

A front reduction catalyst 2 is disposed within a front exhaust pipe 10 near the exhaust terminal 1 of an engine. The reduction catalyst 2 is a carrier made of metallic or ceramic materials and doped with precious metals containing at least rhodium (Rh) for inverting exhaust gas form the engine. Further, the reduction catalyst 2 can be a three-way catalyst composed of rhodium (Rh), platinum (Pt) and palladium (Pd).

A rear exhaust pipe 11 is provided with a secondary air inlet 14 behind the reduction catalyst 2 for introducing secondary air 15 therein. When there are reduction catalysts 2 disposed in the front exhaust pipe, the secondary air inlet 14 is located behind the rearmost of the reduction catalysts 2.

The front exhaust pipe 10 and the rear exhaust pipe 11 are located within the muffler 4. An outlet of the rear reduction catalyst 11 is opened to the first chamber 41 so that gas flowing out of the rear exhaust pipe 11 will enter into the first chamber 41, and then flow into the second chamber 42 through the vents on the first partition board, and then to the third chamber 43 through the vents on the second partition board. Then the exhaust gas flows out of the muffler from the muffler outlet 44.

The preferred embodiment further includes at least one oxidation catalyst 3 disposed in the rear exhaust pipe 11 behind the secondary air inlet 14. The oxidation catalyst 3 is a carrier made of metallic or ceramic materials and doped with precious metals containing at least platinum (Pt) and palladium (Pd) for inverting exhaust gas 13 from the reduction catalyst 2. Further, the oxidation catalyst 3 can be a three-way catalyst composed of rhodium (Rh), platinum (Pt) and palladium (Pd).

The division of the muffler into the first, second and third chambers 41, 42 and 43 has the effect of disturbing the molecules in the gas so as to clean the gas. In the aforesaid catalyst system, the front exhaust gas 12 from the exhaust terminal 1 of an engine into the front exhaust pipe 10 contains large amounts of pernicious gases, such as carbon monoxide (CO), hydrocarbons (HC) and nitrogen oxides (NOX), and oxygen (O2) that is not burned up in the engine, therefore having an air-to-fuel ratio (A/F) less than 14.7. The present invention therefore comprises the following steps.

(1) A reduction reaction is activated by which the reduction catalyst 2 purifies the front exhaust gas 12 from the exhaust terminal 1 of an engine into the front exhaust pipe 10, reducing the nitrogen oxides (NOX) to harmless nitrogen (N2) and oxygen (O2). Thereby, the front exhaust gas 13 from the reduction catalyst 2 has pernicious gases only of carbon monoxide (CO) and hydrocarbons (HC). Further, the oxygen (O2) produced during the reaction of reduction, though with a scarce amount, helps the rear exhaust gas 13 undergoing an oxidation reaction.

(2) Secondary air 15 is introduced from outside into the rear exhaust pipe 11 behind the reduction catalyst 2 so as to supply the rear exhaust gas 13 with oxygen for increasing the air-to-fuel ratio (A/F) of the rear exhaust gas 13 to more than 14.7. The means for controlling the inlet of the secondary air 15 is powered by the negative pressure of the engine, which uses a control valve mounted to the negative pressure terminal of the engine. Thereby, an intermittent negative pressure form the engine sucks the secondary air 15 from outside into the rear exhaust pipe 11 in amounts proportional to the rate of exhaust gas from the engine. Therefore, the rear exhaust gas 13 gets sufficient supply of oxygen, always maintaining an air-to-fuel ratio larger than 14.7. An electric pump can also be used to facilitate the inflow of the secondary air 15 into the rear exhaust pipe 11.

(3) An oxidation reaction is activated by which the oxidation catalyst 3 purifies the rear exhaust gas 13, which has an air-to-fuel ratio larger than 14.7, of carbon monoxide (CO) and hydrocarbons (HC) by inverting them into harmless carbon dioxide (CO2) and water (H2O). The oxidation catalyst 3 therein contains at least precious metals of platinum (Pt) and palladium (Pd) so that the rate of inverting the rear exhaust gas 13 can be effective under the condition that the air-to-fuel ratio is larger than 14.7.

Figure 3:
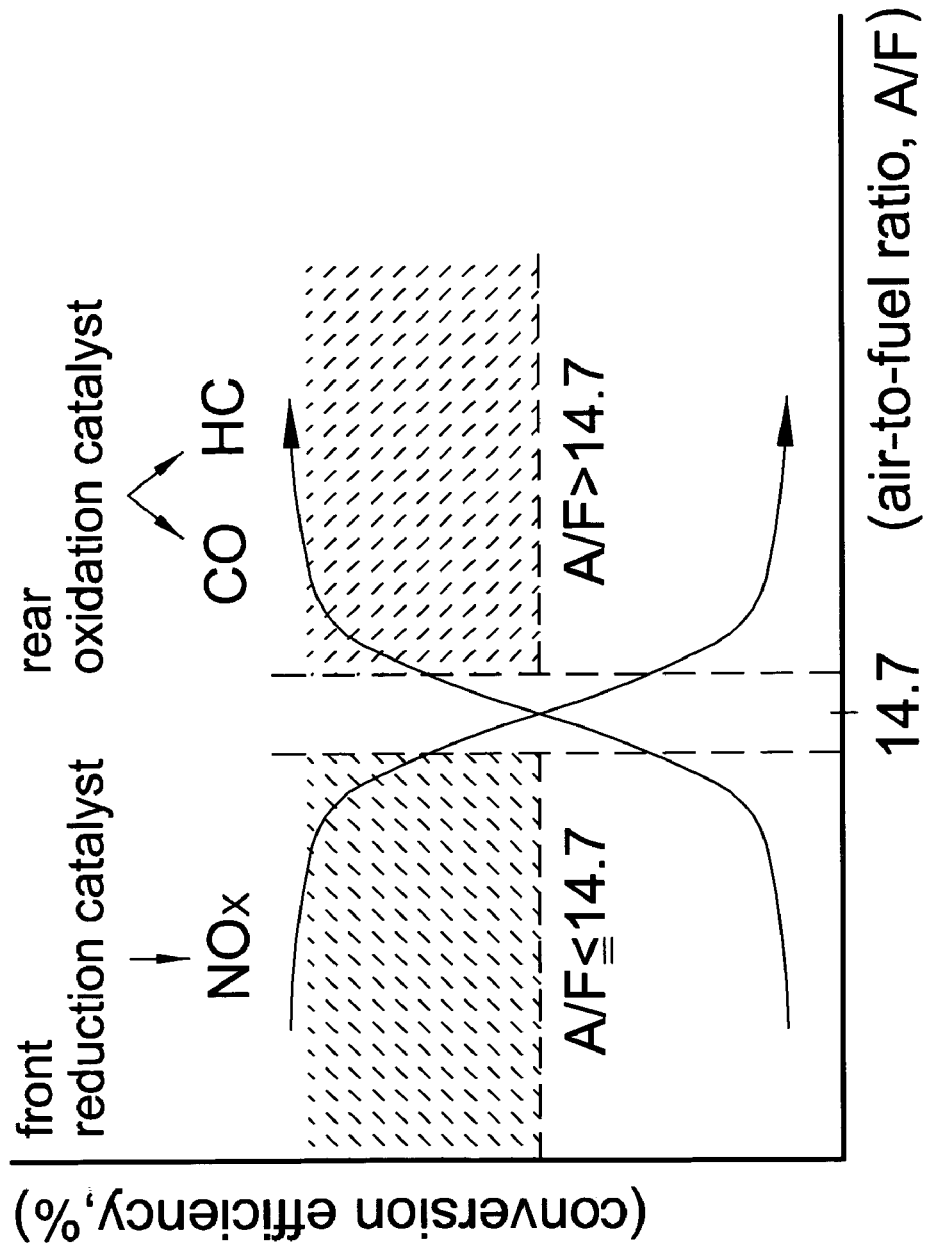
FIG. 3 is a plot disclosing the conversion efficiency versus air-to-fuel ratio relation associated with the present invention, wherein inverting nitrogen oxides (NOX) occurs when air-to-fuel ratio is less than 14.7 and inverting carbon monoxide (CO) and hydrocarbons (HC) occurs when air-to-fuel ratio is larger than 14.7.

The foresaid method including steps (1) to (3) not only effectively increases the rate of purifying exhaust gas of nitrogen oxides (NOX) by the reduction catalyst 2, but also sustains the rate of purifying exhaust gas of carbon monoxide (CO) and hydrocarbons (HC) by the oxidation catalyst 3, as shown in FIG. 3, which significantly improves the quality of exhaust gas from a motorcycle engine.

Further, according to the preferred embodiment illustrated in FIG. 2, the exhaust pipes 10 and 11 are housed in a muffler 4. In other words, the front reduction catalyst 2, the secondary air inlet 14 and the rear oxidation catalyst 3 can be mounted on the exhaust pipes 10 and 11 or the partition boards of the muffler 4, as shown in FIG. 2. Either way falls in the scope of the present invention.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A muffler device with catalysts for improving purifying exhaust gas of nitrogen oxides within a motorcycle exhaust pipe; the device comprising:
   a muffler divided into three chambers, a first chamber, a second chamber, and a third chamber; the first and second chamber being spaced by a first partition board; the second and third chambers being isolated by a second partition board; wherein there are vents being formed on the first and second partition board so that air can flowing through the vents; the muffler further including a muffler outlet;
   a front exhaust pipe connected to an exhaust terminal of an engine for receiving exhausting gas from the engine;
   a front reduction catalyst disposed within the front exhaust pipe near the exhaust terminal of an engine;
   a rear exhaust pipe provided with a secondary air inlet behind the front reduction catalyst for introducing secondary air therein; wherein when there are rear reduction catalysts disposed in the rear exhaust pipe, and a secondary air inlet is located behind the rearmost of the front reduction catalysts;
   wherein the front exhaust pipe and the rear exhaust pipe are located within the muffler; an outlet of the rear reduction catalyst is opened to the first chamber so that gas flowing out of the rear exhaust pipe will enter into the first chamber, and then flow into the second chamber; and then to the third chamber; then the exhaust gas flows out of the muffler from the muffler outlet.

2. The muffler device with catalysts for improving purifying exhaust gas of nitrogen oxides within a motorcycle exhaust pipe of claim 1 wherein an inner wall of the carrier of said reduction catalyst is doped with at least metallic rhodium (Rh).

3. The muffler device with catalysts for improving purifying exhaust gas of nitrogen oxides within a motorcycle exhaust pipe of claim 1 wherein an inner wall of the carrier of said reduction catalyst is doped with metallic rhodium (Rh), platinum (Pt) and palladium (Pd).

4. The muffler device with catalysts for improving purifying exhaust gas of nitrogen oxides within a motorcycle exhaust pipe of claim 1 wherein a negative pressure from said engine drives said secondary air into said exhaust pipe.

5. The muffler device with catalysts for improving purifying exhaust gas of nitrogen oxides within a motorcycle exhaust pipe of claim 1 wherein an electric air pump drives said secondary air into said exhaust pipe.

6. The muffler device with catalysts for improving purifying exhaust gas of nitrogen oxides within a motorcycle exhaust pipe of claim 1 wherein an inner wall of the carrier of said oxidation catalyst is doped with at Least metallic platinum (Pt) and palladium (Pd).

7. The muffler device with catalysts for improving purifying exhaust gas of nitrogen oxides within a motorcycle exhaust pipe of claim 1 wherein an inner wall of the carrier of said oxidation catalyst is doped with metallic rhodium (Rh), platinum (Pt) and palladium (Pd).

* * * * *